(No Model.)
C. H. RUDD.
FIRE ALARM TELEGRAPH.
No. 511,462.  Patented Dec. 26, 1893.
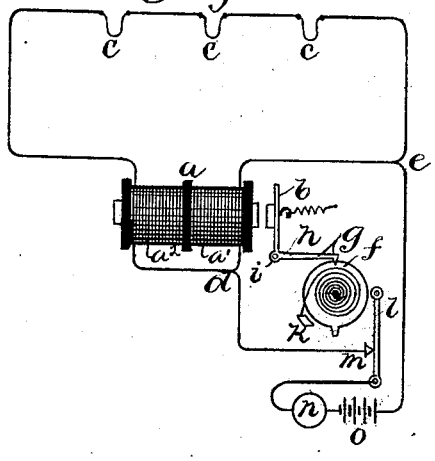
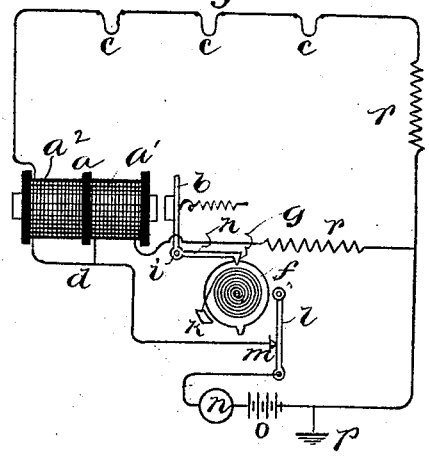
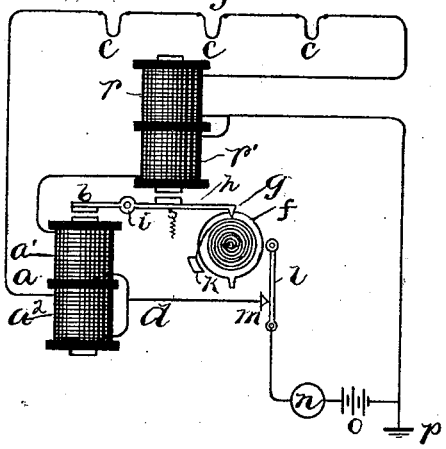
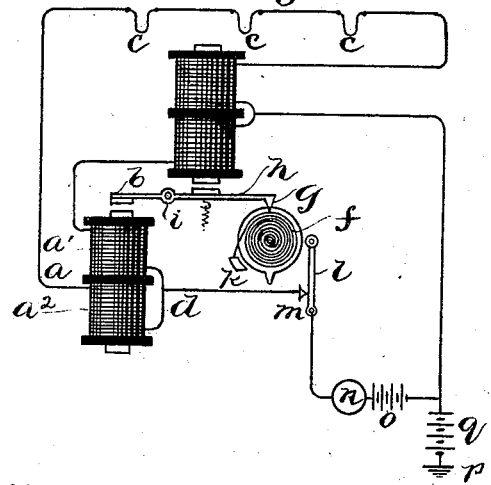
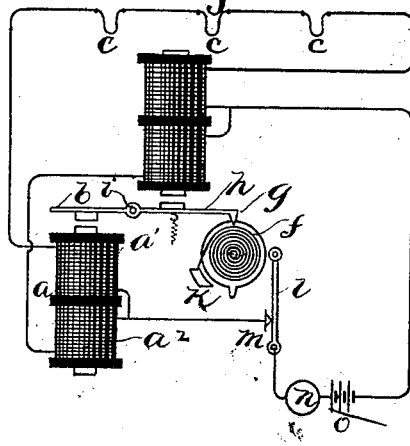
Witnesses:
George L. Cragg
George McMahon
Inventor:
Charles H. Rudd
By Barton & Brown
Attys

UNITED STATES PATENT OFFICE.

CHARLES H. RUDD, OF CHICAGO, ILLINOIS, ASSIGNOR TO THE WESTERN ELECTRIC COMPANY, OF SAME PLACE.

FIRE-ALARM TELEGRAPH.

SPECIFICATION forming part of Letters Patent No. 511,462, dated December 26, 1893.

Application filed May 19, 1892. Renewed May 15, 1893. Serial No. 474,287. (No model.)

*To all whom it may concern:*

Be it known that I, CHARLES H. RUDD, a citizen of the United States, residing at Chicago, in the county of Cook and State of Illinois, have invented a certain new and useful Improvement in Fire-Alarm Telegraphs, (Case No. 18,) of which the following is a full, clear, concise, and exact description, reference being had to the accompanying drawings, forming a part of this specification.

My invention relates to that class of automatic electric fire alarms which is operated with closed circuit.

Its object is to provide a method of indicating at a central station the occurrence of a ground at a substation or district, as I prefer to call a building protected by the system, of which the present invention constitutes an improvement, and which is more generally described in my application Serial No. 408,581. In this system it is a matter of great importance that the meallic circuit, which starts out from a central station and passes through each district and then returns to the central station, and also branches of this metallic circuit, should be kept free from ground connections, and to that end it is the aim of my invention to provide means whereby the ground occurring in any district will be indicated at the central station, and further will cause the district number to be recorded at the central office when the ground occurs within the limits of any district.

It is not important to provide a method for indicating grounds which occur between districts upon the metallic circuit, because it is feasible and common in practice to determine the existence of such grounds and to locate them by testing from the central office. I do not therefore aim in my invention to provide means for automatically locating grounds upon the metallic circuit between districts.

It will be understood that a district may include several floors of a building, or it may be divided into subdistricts in various ways. In considering my invention, however, it is only necessary to deal with one undivided district and the central station, which are accordingly represented in the accompanying drawings which illustrate my invention.

Figure 1 is a diagrammatic illustration of the system to which my invention is applied. Fig. 2 is a diagrammatic illustration showing the modification of the system which is introduced by my invention. Fig. 3 shows a further modification by substituting for the resistance of Fig. 2 a differential magnet. Fig. 4 represents another step in the complete invention under consideration, in which a supplementary battery is introduced between the central station ground and the metallic circuit. Fig. 5 shows the complete invention embodying the various steps, and also the addition of a detector or galvanometer introduced between the supplementary battery and the metallic circuit.

In referring to the different figures, I use similar letters of reference to indicate similar parts.

The differential magnet $a$ has two coils adapted to act in opposition to each other upon the armature $b$. When both coils are energized with currents of the same polarity, one of said coils $a'$ is included in the main circuit, and I also include in this same circuit a resistance $r'$, shown in Fig. 2. The other coil $a^2$ of the neutral relay is included in a shunt or branch circuit, which branch circuit includes suitable heat responsive devices $c\ c\ c$, and in the modification of my invention the resistance $r$ shown in Fig. 2. The branch and the main circuits are divided at $d$ and reunite at $e$. The attraction of the armature $b$ operates in any suitable manner to release mechanism by which the break wheel $f$ is rotated; this break wheel operating to open and close the circuit and thus send to the central office the number of the district. As mechanism for accomplishing this is well known, I represent only the essential parts thereof by the catch $g$ adapted to be raised by the lever $h$ attached to the armature and pivoted at $i$; thus releasing the break wheel $f$ which is rotated by the spring or weight $k$. Upon the periphery of the break wheel $f$ are teeth arranged to press against the lever $l$, thus opening the contact $m$ by means of which a signal is transmitted to the central office through the operation of a back contact relay and register located there and indicated by the letter $n$. The main battery $o$, which operates the entire system, is located preferably at the central office. The ground $p$, the supplementary battery $q$ and the detector $s$ have functions to perform in accomplishing the results to be obtained, which will be understood by the description of the operation of the above described apparatus and circuits.

The method of operation of the apparatus and circuits shown in Fig. 1 is set forth in my application Serial No. 408,581. I will briefly refer to this method of operation. When the circuit is broken by the fusing of any one of the thermostats in the district, or by the actuation of the heat responsive devices in any suitable way to open the branch circuit which includes the coil $a^2$ of the differential magnet, the differential magnet $a$, which has hitherto been unmagnetized owing to the opposing currents of the same polarity and equal strength flowing through the two coils, becomes magnetized by the current flowing through the main circuit and the coils $a'$ included therein. The armature $b$ is thereby attracted, thus releasing the break wheel $f$ and transmitting to the recording apparatus of the central office the number of the district.

For the purpose of notifying the central office of any disturbance of the system, such as occurs by a ground connection having been put on at a district, without in any wise interfering with its operation of sending an alarm when the circuit is open by one of the heat responsive devices, I add the resistance $r'$ included in the main circuit and $r$ included in the branch circuit and the ground $p$ at the central station. The resistance $r'$ I make equal to the resistance of the branch circuit including the resistance $r$ and the heat responsive devices $c$ $c$ $c$. This resistance $r'$ may be made adjustable, but ordinarily this is not necessary as a close enough balance can be secured with an ordinary resistance coil. As resistances $r$ and $r'$ are in practice in proximity to each other, any ground that is liable to occur in a district will develop between the resistance $r$ and the differential magnet $a$. The result of a ground connection would be to cut out the resistance $r$ from the shunt circuit and thus balance the system, allowing sufficient current to flow through the coil $a^2$ to attract the armature $b$ and send in the number of the district to the central office in the ordinary manner.

For the purpose of adding to the certainty and force with which this apparatus operates, I wind the resistances $r$, $r'$ upon a core, making a second differential magnet $t$. The functions of $r$ and $r'$, as resistances, remain as before, but an additional function is given by thus disposing of them upon a core, namely, the preservation of an unmagnetized condition of the coil of the differential magnet $t$, while the system is balanced, as it is under normal conditions, and the magnetization of the core of this differential magnet when the system is unbalanced, in a manner to co-operate with the differential magnet $a$. As when $r$ and $r'$ are simple resistances, a ground upon the branch circuit will cut out the coil $r$, leaving the coil $r'$ in circuit and co-operating with coil $a'$ to move the armature $b$ upon its pivot $i$, thus releasing the mechanism of the break wheel, and sending the signal in the usual way. To make this apparatus and arrangement of circuits still more effective, I add the supplementary battery $q$ between the main circuit and the ground $p$ at the central office, and dispose this battery so that it will co-operate with the main battery $o$ in its action upon coil $a^2$; that is, I preferably arrange the supplementary battery so that it will be in series with the main battery $o$ in its operation upon magnet $a^2$ when the ground occurs within the limits of the district.

For the purpose of distinguishing between a signal indicating a ground at a district, and a signal indicating that the heat responsive device is operated to open the circuit in the way in which it is designed, upon the rise of the temperature above a certain predetermined point, I connect into the circuit between the main circuit and the ground at the central office, the detector $s$, which will respond to the current which finds its way to ground, but will not respond to the ordinary opening of the circuit in a case where it is intended that an alarm should be recorded.

Having thus described my invention, what I claim as new, and desire to secure by Letters Patent, is—

1. In an automatic electric fire alarm, the combination with a metallic circuit extending from the central office through the district or districts to be protected, of a differential magnet having two coils adapted to act in opposition to each other upon an armature when both are energized with currents of the same polarity, one of said coils being included in the branch circuit together with heat responsive devices adapted to open the circuit when actuated, and a resistance coil, the main circuit including the other of said coils, and a resistance about equal to the resistance in the branch circuit including the heat responsive devices, said main circuit shunting the said first coil, the heat responsive devices and the branch circuit resistance, mechanism adapted to be actuated by said differential magnets, whereby a signal is sent to the central office, and the ground connection at the central office, substantially as described.

2. In a closed circuit signaling system, the combination with a main circuit extending from the central office through the districts to be protected, of two differential magnets adapted to co-operate upon the same armature lever, each of said differential magnets having one of its coils included in said main circuit, and the other of its coils included in a branch circuit, which branch circuit also includes heat responsive devices, mechanism adapted to be actuated by said differential magnets, whereby a signal is sent to the central office, and a ground connection at said central office, substantially as described.

3. In an automatic electric fire alarm, the combination with a metallic circuit extending from the central office through the district or districts to be protected, of a differential magnet having two coils adapted to act in opposition to each other upon an armature when both are energized with currents of the same polarity, one of said coils being included in the branch circuit together with heat responsive devices adapted to open the circuit when actuated, and a resistance coil, the main circuit including the other of said coils, and a resistance about equal to the resistance in the branch circuit including the heat responsive devices, said main circuit shunting the said first coil, the heat responsive devices and the branch circuit resistance, mechanism adapted to be actuated by said differential magnets, whereby a signal is sent to the central office, the ground connection at the central station, and a supplementary battery connected between the ground and the main circuit adapted to co-operate with the battery in said main circuit.

4. In an automatic electric fire alarm, the combination with a metallic circuit extending from the central office through the district or districts to be protected, of a differential magnet having two coils adapted to act in opposition to each other upon an armature when both are energized with currents of the same polarity, one of said coils being included in the branch circuit together with heat responsive devices adapted to open the circuit when actuated, and a resistance coil, the main circuit including the other of said coils, and a resistance about equal to the resistance in the branch circuit including the heat responsive devices, said main circuit shunting the said first coil, the heat responsive devices and the branch circuit resistance, mechanism adapted to be actuated by said differential magnets, whereby a signal is sent to the central office, the ground connection at the central station, and a galvanometer located between said ground connection and the main circuit.

5. The combination with an electric alarm circuit extending from a central station through a district to be protected, of two electro-magnetic helices in different parallel branches of said circuit, heat responsive devices adapted to open the circuit when actuated included in one of said branches, a resistance coil in the branch with the heat responsive devices, and mechanism adapted to be actuated by the energization of one only of said helices, but to be prevented from operation by the simultaneous energization of both helices to send a fire alarm signal, substantially as described.

6. The combination with a fire alarm circuit, of two electro-magnetic helices in different parallel branches thereof adapted to act in opposition to each other upon an armature, heat responsive devices adapted to open the circuit when actuated, and a resistance coil included in one of said branches, mechanism controlled by said armature for sending the fire alarm signal, and a ground branch from the main circuit, substantially as described.

In witness whereof I hereunto subscribe my name this 3d day of February, A. D. 1892.

CHARLES H. RUDD.

Witnesses:
M. JEANE TALLETT,
GEORGE L. CRAGG.